Figure 1:
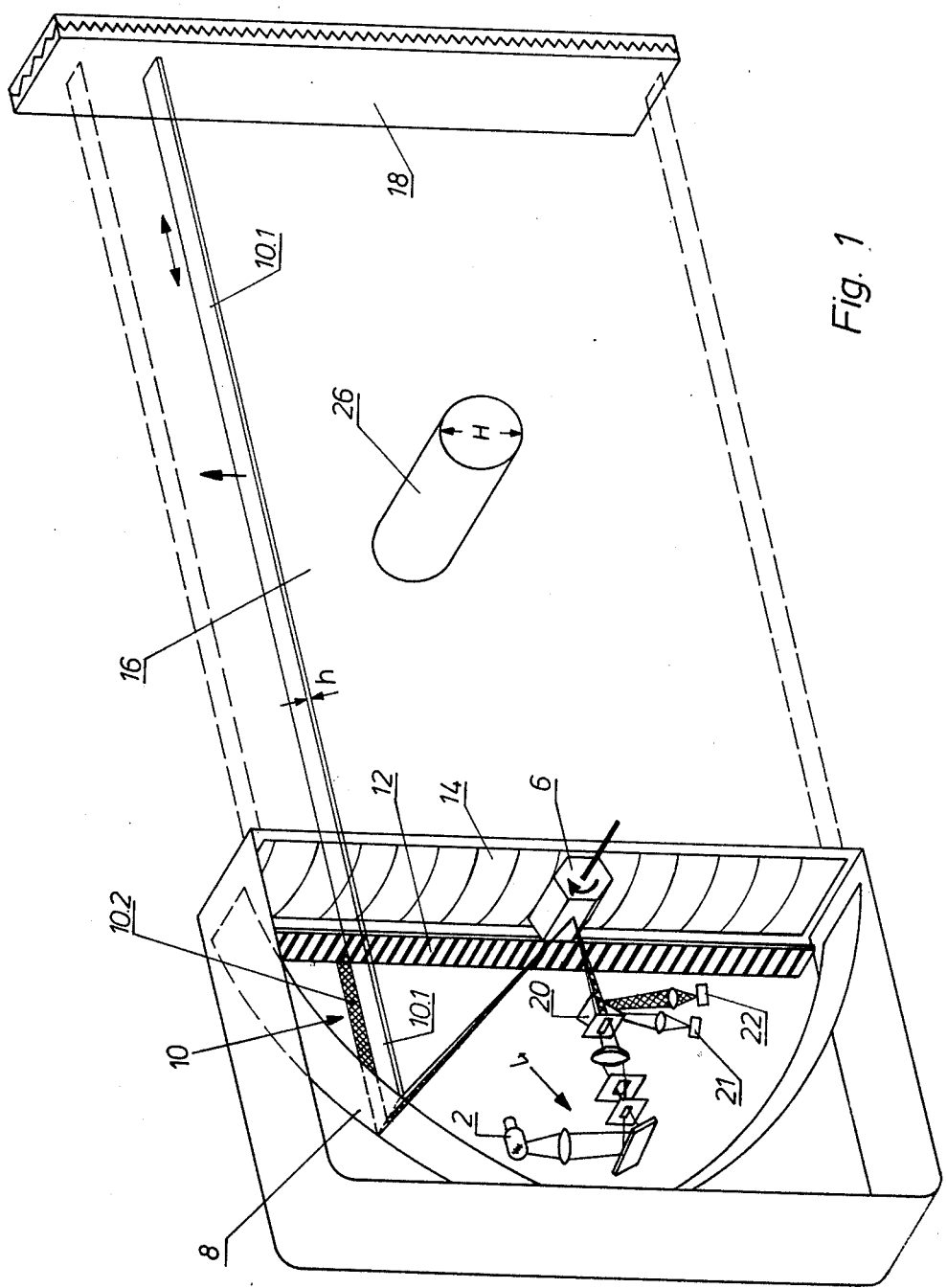
Figure 2:
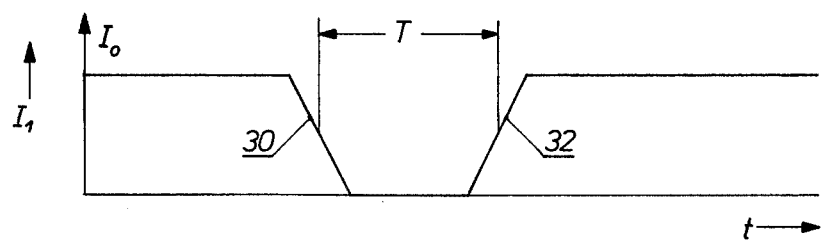
Figure 3:
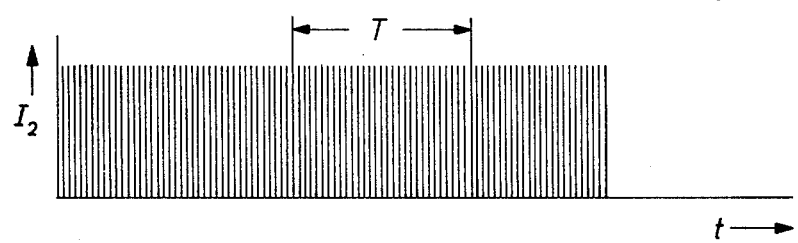
Figure 4:
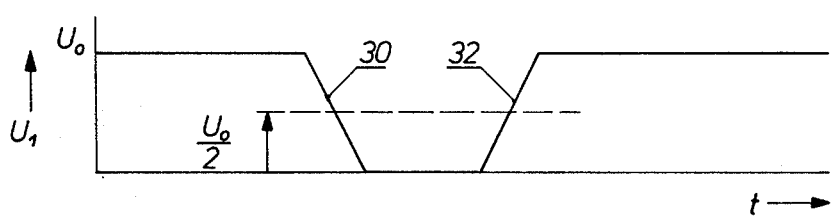

United States Patent [19]

Erdmann

[11] 4,025,796
[45] May 24, 1977

[54] PHOTOELECTRIC INSTRUMENT FOR MEASURING THE LENGTH OF AN OBJECT

[75] Inventor: Jurgen Erdmann, Waldkirch, Germany

[73] Assignee: Erwin Sick Optik-Elektronik, Waldkirch, Germany

[22] Filed: July 9, 1975

[21] Appl. No.: 594,554

[30] Foreign Application Priority Data

July 19, 1974 Germany .......................... 2434829

[52] U.S. Cl. .............................. 250/560; 250/235; 250/237 R
[51] Int. Cl.² ........................................ G01N 21/30
[58] Field of Search .......... 250/214, 560, 561, 237, 250/235; 356/157, 158, 159, 160, 167

[56] References Cited

UNITED STATES PATENTS

| | | | |
|---|---|---|---|
| 2,659,823 | 11/1953 | Vossberg | 250/560 |
| 3,710,128 | 1/1973 | Kubisiak | 250/560 |
| 3,777,167 | 12/1973 | Shepherd | 250/560 |
| 3,907,439 | 9/1975 | Zanoni | 356/167 |

*Primary Examiner*—David C. Nelms
*Attorney, Agent, or Firm*—Cushman, Darby & Cushman

[57] ABSTRACT

A photoelectronic instrument for measuring the length of an object by means of a slim scanning beam of light which, when not interrupted by the object, activates a photoelectric transducer, wherein, for the purpose of determining trigger points when half the light beam is obscured at the beginning and reemerges at the end of the period of cut-off, irrespective of the absolute magnitude of the light flux of the unobscured light beam, a circuit is provided for differentiating, with respect to time, a signal obtained from the photoelectric transducer and proportional to the magnitude of the light flux (light flux signal $U_1$), a signal proportional to the differential quotient ($dU_1/dt$) thus obtained being rectified, multiplied by a preset factor (p.T), and the product of the multiplication and the light flux signal ($U_1$) being applied to the inputs of a comparator functioning as a coincidence circuit for generating an output signal ($U_4$) which, subject to an appropriate selection of the factor (p.T), abruptly changes when $$\frac{dU_1}{dt} \cdot p.T = \frac{U_o}{2}$$

where $U_o$ is the light flux signal of the unobscured scanning light beam.

13 Claims, 8 Drawing Figures

PHOTOELECTRIC INSTRUMENT FOR MEASURING THE LENGTH OF AN OBJECT

The present invention relates to photoelectronic instruments for measuring the length of an object by a slim scanning light beam which, before and after being cut off by the object, activates a photoelectric transducer.

A difficulty encountered when measuring the length of an object by means of such a slim pencil beam of light is the impossibility of making the beam sufficiently slim by purely optical means. This is a difficulty which makes itself increasingly felt the further away the object is from the light source. The present invention therefore seeks to provide an instrument in which a coincidence switch is triggered when exactly half the width of the pencil beam of light is obscured by or re-emerges from the object that is to be measured. This could be fairly easily accomplished by a coincidence switch responding at a constant threshold value of the light flux provided the light flux of the unobscured light beam was also constant. However, this cannot be relied upon because the brightness of a light source changes in the course of time due to ageing, and because optical means such as rotating mirrors, reflectors and light exit windows in the light path are liable to become dirty. a coincidence switch operating at a highly constant threshold value would always respond to exactly the same light flux. The operating point would not then necessarily coincide with the exact centre of the light beam cross section. However, coincidence with the centre of the light beam cross-section is essential if the length of the object is to be accurately measured.

It is therefore the object of the present invention to provide an instrument as aforesaid, wherein, irrespective of the absolute magnitude of the light flux of the light beam, a coincidence switch will operate when exactly half the cross-section of the light beam has been obscured or has re-emerged.

The present invention provides a photoelectronic instrument for measuring the length of an object by a slim scanning light beam which, before and after being cut off by the object, activates a photoelectric transducer, wherein, for the purpose of determining trigger points when half the light beam is obscured at the beginning and re-emerges at the end of the period of cut-off, irrespective of the absolute magnitude of the light flux of the unobscured light beam, a circuit is provided for differentiating, with respect to time, a signal obtained from the photoelectric transducer and proportional to the magnitude of the light flux (light flux signal $U_1$), a signal proportional to the differential quotient ($dU_1/dt$) thus obtained being rectified, multiplied by a preset factor (p.T), and the product of the multiplication and the light flux signal ($U_1$) being applied to the inputs of a comparator functioning as a coincidence circuit for generating an output signal ($U_4$) which, subject to an appropriate selection of the factor (p.T) abruptly changes when $$\frac{dU_1}{dt} \cdot p.T = \frac{U_o}{2}$$

where $U_o$ is the light flux signal of the unobscured scanning light beam.

When the light beam is obscured and when it re-emerges the fall and rise of the light flux signal defines sloping flanks. Consequently the differential quotients have substantially constant values during these periods of obscuration and re-emergence. Assuming a particular object located in a particular position in the scanning field, the time needed for the beam to be completely obscured and to have completely reemerged is always the same, irrespective of the absolute magnitude of the light flux. The flanks of the light flux signal therefore vary in steepness according to whether the light flux signal falls from a higher or lower absolute level to zero. Consequently the values of the differential quotients vary accordingly. It follows that the value of the differential quotient is a measure of the magnitude of the light flux of the unobscured scanning beam.

By suitably selecting a preadjustable factor which is multiplied with the differential quotient it is possible in a comparison with the light flux signal to ensure that the product of the differential quotient and the selected factor when the scanning beam is half obscured or has half reemerged will be equal to exactly half the light flux. The comparator, which functions as a coincidence switch, therefore responds when the light flux reaches half its magnitude, irrespective of the absolute magnitude of the light flux of the unobscured scanning beam.

Figure 8:
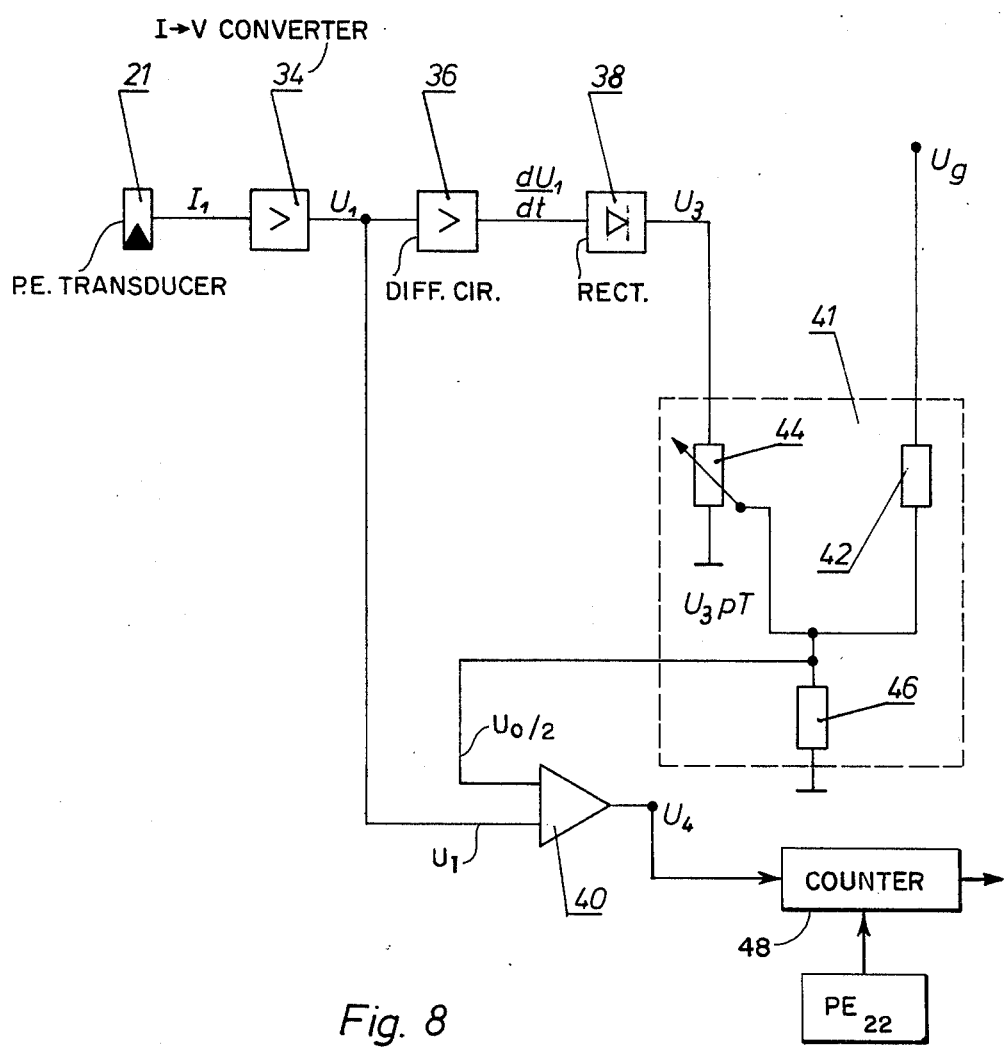

An embodiment of the invention will now be more particularly described with reference to the accompanying drawings, in which:

FIG. 1 is a schematic perspective representation of a photoelectronic instrument for measuring lengths by means of a slim scanning beam of light as already known in the art, FIGS. 2 to 7 are graphs showing signal values plotted over time, and FIG. 8 is a circuit diagram of that part of apparatus according to the present invention which ensures the generation of a trigger signal when the light beam is 50% obscured or uncovered.

In the apparatus for measuring lengths according to FIG. 1, a very thin beam of light is produced by a light source 2 in conjunction with optical means 4 such as collecting lenses, a deflecting mirror and stops, and projected onto a rotary mirror 6. The reflecting point on the rotary mirror 6 is situated at least approximately in the focal axis of a parabolic semi-cylindrical mirror 8. A portion 10.2 (shown hatched) of the light beam 10 reflected by the parabolic mirror is directed onto a vertical reticle strip 12 which is provided alternately along its length with very narrow light transmitting and light absorbing bands which extend across the width thereof.

The portion 10.1 of the light beam passes through an exit window 14 in the apparatus, with a very small height $h$ relative to its width, into an object field or measuring chamber 16 which at its rear end contains a reflector 18. The beam of light portion 10.1 is thereby back reflected into itself to the parabolic mirror 8 which returns it via the rotary mirror 6 to a semi-transparent mirror 20, the latter deflecting it into a photoelectric transducer 21.

In use, an object 26, the height $H$ for example of which is to be measured, is located in a fixed position inside the measuring chamber 16.

When the rotary mirror 6 revolves the scanning light beam portion 10.1 traverses the measuring chamber 16, for instance from the bottom upwards. This causes the photoelectric transducer 21 to generate an output signal in the form of a current $I_1$ which is shown in graph form in FIG. 2. This output signal remains at full amplitude $I_o$ so long as the scanning beam portion 10.1 is not intercepted by the object 26. As soon as the light beam portion 10.1 strikes the bottom edge of the object the signal intensity begins to fall to zero, forming a descending signal flank 30. The signal remains zero for as long as the object prevents the light beam portion 10.1 from being reflected at the back reflector 9. The apparatus is such that the faint diffuse light dispersed by the object can be ignored. As the light beam portion 10.1 begins to clear the upper edge of the object the signal current $I_1$ increases again forming a rising flank 32.

During this process the light beam portion 10.2 scans the reticle strip 12, which in practice will, of course, be divided into much finer bands than is indicated in the drawing, so that the scanning beam portion 10.2 is transmitted back as a series of pulses to concave mirror 8, then to rotary mirror 6 and semitransparent mirror 20 into photoelectric transducer 22. The photoelectric transducer 22 accordingly generates a pulsed signal in the form of a current $I_2$ which is represented in simplified graph form in FIG. 3, i.e. the pulse spacing being exaggerated.

A logic circuit is now required to determine how many reticle pulses (FIG. 3) are contained in the time interval $T$ which elapses from exactly half the light beam being obscured to exactly half the light beam having reemerged. The number of pulses included in this time interval $T$ will then be a measure of the required length, namely of the height $H$ of the object 26. The counting of pulses within a given time interval is as such a known procedure and requires no special description. However, a circuit will be described with reference to FIG. 8 which enables the beginning and end of the interval in the middle of the falling and rising flanks 30 and 32 to be exactly observed without reference to the absolute magnitude of the light flux.

The output current $I_1$ of the photoelectric transducer 21 is first applied to a current-to-voltage converter 34. The output signal $U_1$ of the converter, which is proportional to the current $I_1$ and hence to the reflected light flux of the scanning light beam 10.1, is taken to a differentiating circuit 36. Signal $U_1$ is shown in graph form in FIG. 4. Its shape is similar to that of the $I_1$ signal. It also possesses a descending flank 30 and an ascending flank 32. It has been found that the flanks are sufficiently linear for the purposes of the invention, so that the signals representing the differential quotients $(dU_1/dt)$ are substantially square wave pulses (FIG. 5).

Figure 5:
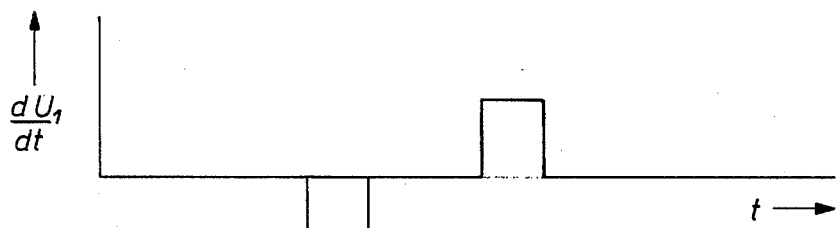
Figure 6:
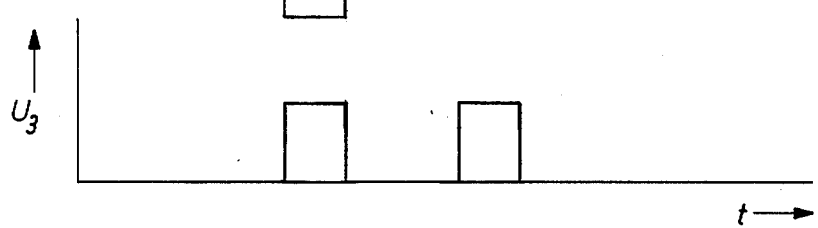
Figure 7:
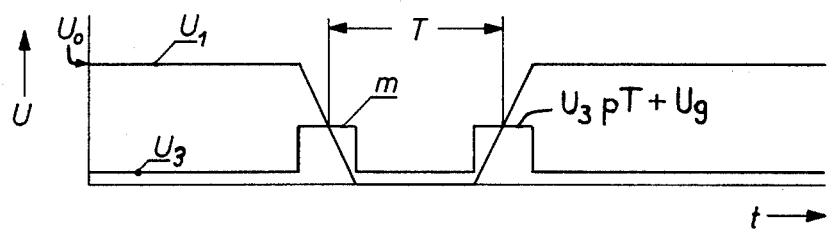

The signals shown in FIG. 5 are applied to a full wave rectifying network 38 which converts all the differential quotient pulses into positive pulses (FIG. 6). The rectified signal according to FIG. 6, which is here designated $U_3$, is applied via a summation member 41 yet to be described to a coincidence switch in the form of a comparator 40 responding to a highly constant reference signal. The $U_1$ signal which appears in the output of the current/voltage converter 34 is applied to the second input of the comparator which therefore generates an output signal $U_4$ which changes abruptly when the voltage $U_1$, during its change from a high to a low level, reaches a voltage equal to the reference voltage applied to the upper input in FIG. 8 of the comparator 40. The reference voltage should be accurate and be the value of $U_o/2$.

The comparator 40 must be prevented from generating a signal when both input signals are zero. For this purpose a supplementary voltage $U_g$ is introduced through a fixed resistor 42. This supplementary voltage is added in the summation member 41 to a voltage $U_3 \cdot p.T$, i.e. a fraction of the voltage $U_3$ obtained by means of a potentiometer 44. More precisely expressed, the currents of both quantities are developed across a fixed resistor 46. At the upper end of this resistor in FIG. 8 the desired summation voltage for the upper input of the comparator 40 is obtained.

$T$ is the scanning interval which elapses from the time the light beam is half obscured to the time it has half reemerged (FIGS. 2 and 7), and $p$ is a factor which can be freely selected by adjustment of the potentiometer 44.

It is now necessary for the sum of the signals $U_g$ and $U_3 \cdot p.T$ to be of appropriate magnitude for the maxima $m$ (FIG. 7) to be exactly equal to $(U_o/2)$. This can be achieved by adjustment of the potentiometer 44. Once the correct adjustment has been made it will not change, irrespective of any change in the absolute magnitude of the light flux due to ageing and dirt, and of the voltage $U_o$ which changes in proportion thereto. The comparator will respond exactly halfway up or down the rising or descending flank, i.e. exactly when half the scanning beam portion 10.1 is obscured at the beginning and has reemerged at the end of the period of cut-off by the measured object and thus determines the interval T between these points in time. This time can now be compared in conventional manner with the output of the photoelectric transducer 22, i.e. with the number of pulses generated during the interval T by the reticle strip. The count resulting from counter 48 indicates the required length.

Expressed as a formula, the comparator 40 responds when the following condition is fulfilled, the supplementary voltage $U_g$ being for the time being neglected:

$$\frac{dU_1}{dt} \cdot p.T = \frac{U_o}{2}$$

The differential quotient $(dU_1/dt)$ is thus multiplied with a factor $p.T$ which must be suitably chosen for the product to be exactly equal to $(U_o/2)$.

If this formula is amplified to include the presence of the supplementary voltage it will read $$\frac{dU_1}{dt} \cdot p \cdot T + U_g = \frac{U_o}{2}$$

The invention has been illustratively described in conjunction with the use of a reference reticle 12. However, the trigger point when half the light beam is obscured upon striking and reemerges upon clearing the measured object can also be determined without the use of such a reticle, for instance by making use of an analogue measurement of length.

What is claimed is:
1. In a photoelectronic instrument for measuring a dimension of an object, the improvement comprising:
means including scanning means for producing a slim scanning light beam and directing said beam progressively in a given direction for scanning across an object field adapted to contain a said object with both of the opposite sides of said field in said given direction being fully unobscured by said object, circuit means including photoelectric transducer means for receiving said scanning beam to the extent it is not fully obscured by said object during said scanning and developing a continuous electrical signal $U_1$ proportional uniformly to the magnitude of the light flux on said object field and having an instant magnitude of $U_o$ when said beam is fully unobscured as aforesaid, means for continuously developing from said $U_1$ signal a half signal $U_o/2$ representing the instant value of said $U_1$ signal when half the light beam is obscured by said object either at the beginning and ending of an object scan by said beam regardless of the absolute magnitude of said fully unobscured beam, and coincidence means connected to receive said $U_1$ and $U_o/2$ signals for comparing same and generating an output signal which changes abruptly when said $U_1$ and $U_o/2$ signals are equal.

2. An instrument as in claim 1 said circuit means including a current-to-voltage converter connected to said photoelectric transducer means output for generating said continuous electrical signal $U_1$, means connecting the output of said converter to said coincidence means for conveying said $U_1$ signal thereto, said half signal developing means being also connected to the output of said converter and comprising, in series connection, a differentiating network, a full-wave rectifier and a potentiometer for presetting a selectable part $p$ of a factor $pT$ for developing a rectified differentiating signal multiplied by said factor $pT$, the outputs of the converter and potentiometer being connected as inputs to said coincidence means for causing its said output signal to change abruptly when the following equation is satisfied:

$$\frac{dU_1}{dt} \times pT = \frac{U_o}{2}$$

T being the time interval between two abrupt changes in the output signal of said coincidence means respectively occurring when half of the scanning light beam is obscured by said object at the beginning and ending of an object scan.

3. An instrument as in claim 1, wherein said means for developing said half signal includes:

means for differentiating said $U_1$ signal with respect to time to obtain a differential quotient $dU_1/dt$ signal, means for rectifying said differential signal, and means for multiplying the rectified differential signal by a preset factor $pT$.

4. An instrument as in claim 3 including a summing network containing said multiplying means for adding to said multiplied signal a supplemental signal $U_a$ which is small in relation to said half signal, and wherein the factor $pT$ is preset to satisfy the equation:

$$\frac{dU_1}{dt} \times pT + U_a = \frac{U_o}{2}$$

when said coincidence means output signal changes abruptly as aforesaid.

5. An instrument as in claim 1, wherein said slim scanning light producing and scanning means includes:

a light source, means for receiving light from said source and developing said slim beam, a concave mirror having a focal axis, a rotatable scanning mirror having its successive reflecting points disposed approximately on said focal axis for receiving and sweeping said slim light beam from one end of said concave mirror to the other for causing said slim beam of light to be directed outwardly from said concave mirror into said field for scanning said field and any object therein in the direction of the said dimension to be measured, reflector means at the end of said field opposite said concave mirror for reflecting back to said concave mirror and then to said rotary mirror the whole or partial light beam not obscured by an object disposed in said field intermediate said concave mirror and reflector means, and means for directing said reflected light beam from said rotary mirror to said photoelectric transducer means.

6. An instrument as in claim 5 wherein said concave mirror is parabolic and said reflector means includes a reflector rectilinearly extending in said dimension direction perpendicular to said light beam.

7. An instrument as in claim 6, including reticle means and second photoelectric transducer means positioned to develop timing pulses from a portion of said swept light beam impinging upon said reticle means, and means for counting the number of said timing pulses which occur during at least two successive abrupt changes of said output signal of the coincidence means to determine the dimension in said direction of an object in said field.

8. An instrument as in claim 1, including means for developing timing pulses, and means for counting the number of said timing pulses which occur during at least two successive abrupt changes of said output signal of the coincidence means to determine the dimension in said direction of an object in said field.

9. In a photoelectronic instrument for measuring a dimension of an object in a field by a slim scanning light beam which, before and after being cut off by the object, activates photoelectric transducer means, the improvement comprising:

circuit means responsive to the output of said transducer means for developing a continuous electrical signal $U_1$ proportional uniformly to the magnitude of the light flux on said object field and having an instant magnitude of $U_o$ when said beam is fully unobscured by said object, means for continuously developing from said $U_1$ signal a half signal $U_o/2$ representing the instant value of said $U_1$ signal when half the light beam is obscured by said object either at the beginning and ending of an object scan by said beam regardless of the absolute magnitude of said fully unobscured beam, and coincidence means connected to receive said $U_1$ and $U_o/2$ signals for comparing same and generating an output signal which changes abruptly when said $U_1$ and $U_o/2$ signals are equal.

10. An instrument as in claim 9 wherein said circuit means includes a current-to-voltage converter connected to said photoelectric transducer means output for generating said continuous electrical signal $U_1$, means connecting the output of said converter to said coincidence means for conveying said $U_1$ signal thereto, said half signal developing means being also connected to the output of said converter and comprising, in series connection, a differentiating network, a full-wave rectifier and a potentiometer for presetting a selectable part $p$ of a factor $pT$ for developing a rectified differentiating signal multiplied by said factor $pT$, the output of the converter and potentiometer being connected as inputs to said coincidence means for causing its said output signal to change abruptly when the following equation is satisfied:

$$\frac{dU_1}{dt} \times pT = \frac{U_u}{2}$$

$T$ being the time interval between two abrupt changes in the output signal of said coincidence means respectively occurring when half of the scanning light beam is obscured by said object at the beginning and ending of an object scan.

11. An instrument as in claim 9, wherein said means for developing said half signal includes:

means for differentiating said $U_1$ signal with respect to time to obtain a differential quotient $dU_1/dt$ signal, means for rectifying said differential signal, and means for multiplying the rectified differential signal by a preset factor $pT$.

12. An instrument as in claim 11 including a summing network containing said multiplying means for adding to said multiplied signal a supplemental signal $U_y$ which is small in relation to said half signal, and wherein the factor $pT$ is preset to satisfy the equation:

$$\frac{dU_1}{dt} \times pT + U_y = \frac{U_u}{2}$$

when said coincidence means output signal changes abruptly as aforesaid.

13. An instrument as in claim 9, including means for developing timing pulses, and means for counting the number of said timing pulses which occur during at least two successive abrupt changes of said output signal of the coincidence means to determine the dimension in said direction of an object in said field.

* * * * *